(12) United States Patent
Wiesmueller et al.

(10) Patent No.: US 10,144,904 B2
(45) Date of Patent: Dec. 4, 2018

(54) PROCESS FOR EXTRACTION OF AROMA CHEMICALS FROM FAT-CONTAINING AND/OR AQUEOUS LIQUID PHASES

(71) Applicants: Johann Wiesmueller, Garching (DE); Franz Michlbauer, Kirchweidach (DE); Guenther Oberbauer, Unterneukirchen (DE); Helmut Hausner, Trostberg (DE); Harald Kaiser, Garching (DE)

(72) Inventors: Johann Wiesmueller, Garching (DE); Franz Michlbauer, Kirchweidach (DE); Guenther Oberbauer, Unterneukirchen (DE); Helmut Hausner, Trostberg (DE); Harald Kaiser, Garching (DE)

(73) Assignee: Evonik Degussa GmbH, Essen (DE)

( * ) Notice: Subject to any disclaimer, the term of this patent is extended or adjusted under 35 U.S.C. 154(b) by 8 days.

(21) Appl. No.: 15/362,849

(22) Filed: Nov. 29, 2016

(65) Prior Publication Data

US 2017/0158986 A1 Jun. 8, 2017

(30) Foreign Application Priority Data

Dec. 4, 2015 (EP) .................... 15197955

(51) Int. Cl.
*C11B 9/02* (2006.01)
*B01D 11/04* (2006.01)
*A23L 27/10* (2016.01)
*A23L 27/12* (2016.01)
*B01D 11/00* (2006.01)

(52) U.S. Cl.
CPC .......... *C11B 9/025* (2013.01); *B01D 11/0403* (2013.01); *B01D 11/0407* (2013.01); *A23L 27/11* (2016.08); *A23L 27/12* (2016.08); *A23V 2002/00* (2013.01); *B01D 2011/005* (2013.01)

(58) Field of Classification Search
CPC ...................................................... C11B 9/025
See application file for complete search history.

(56) References Cited

U.S. PATENT DOCUMENTS 3,477,856 A   11/1969 Schultz
4,493,854 A   1/1985 Friedrich et al.
(Continued)

FOREIGN PATENT DOCUMENTS

AU   578269 B2   9/1985
CA   1 179 546 A   12/1984
(Continued)

OTHER PUBLICATIONS

Eggers et al. ("Extraction Device for High Viscous Media in a High-Turbulent Two-Phase Flow with Supercritical CO2", The Journal of Supercritical Fluids, Technische Universität Hamburg-Harburg, 1993, 6, pp. 31-37) (Year: 1993).*
(Continued)

*Primary Examiner* — Arrie L Reuther
(74) *Attorney, Agent, or Firm* — Oblon, McClelland, Maier & Neustadt, L.L.P.

(57) ABSTRACT

The present invention relates to a process for continuous extraction of an aqueous and/or fat-containing liquid phase F comprising aroma chemicals with a gas G in the liquid or supercritical state.

17 Claims, 2 Drawing Sheets

(56) References Cited

U.S. PATENT DOCUMENTS

| | | | |
|---|---|---|---|
| 4,683,063 A | 7/1987 | Rice | |
| 4,820,537 A | 4/1989 | Katz | |
| 4,929,348 A * | 5/1990 | Rice | B01D 11/0203 196/14.52 |
| 4,959,158 A | 9/1990 | Meikrantz | |
| 5,510,134 A | 4/1996 | Simon et al. | |
| 5,626,756 A | 5/1997 | Heidlas et al. | |
| 5,714,658 A | 2/1998 | Heidlas et al. | |
| 5,789,647 A | 8/1998 | Heidlas et al. | |
| 5,855,786 A | 1/1999 | Eggers et al. | |
| 5,869,123 A | 2/1999 | Osajima et al. | |
| 6,288,130 B1 | 9/2001 | Heidlas et al. | |
| 6,331,253 B1 | 12/2001 | Schrive et al. | |
| 6,551,501 B1 | 4/2003 | Whitehurst et al. | |
| 6,599,533 B1 | 7/2003 | Heidlas et al. | |
| 6,680,284 B1 | 1/2004 | Heidlas et al. | |
| 6,821,413 B1 | 11/2004 | Alkhalidl | |
| 7,713,581 B2 | 5/2010 | Heidlas et al. | |
| 8,513,456 B2 | 8/2013 | Wiesmuller et al. | |
| 2002/0189976 A1 * | 12/2002 | Wilde | A23D 9/00 208/308 |
| 2004/0026319 A1 | 2/2004 | Chattopadhyay et al. | |
| 2004/0049059 A1 | 3/2004 | Mueller | |
| 2004/0071781 A1 | 4/2004 | Chattopadhyay et al. | |
| 2004/0156911 A1 | 8/2004 | Chattopadhyay et al. | |
| 2004/0210046 A1 | 10/2004 | Kersting et al. | |
| 2005/0202563 A1 | 9/2005 | Dasgupta et al. | |
| 2006/0247455 A1 | 11/2006 | Krumbholz et al. | |
| 2006/0292279 A1 | 12/2006 | Wiesmuller et al. | |
| 2007/0017550 A1 | 1/2007 | Lumia et al. | |
| 2007/0054032 A1 | 3/2007 | Heidlas et al. | |
| 2007/0082101 A1 | 4/2007 | Wiesmuller | |
| 2007/0141017 A1 | 6/2007 | Horska | |
| 2007/0193595 A1 | 8/2007 | Haruki et al. | |
| 2007/0275144 A1 | 11/2007 | Wiesmuller | |
| 2008/0230050 A1 | 9/2008 | Kersting et al. | |
| 2009/0028971 A1 * | 1/2009 | Wiesmuller | C11B 9/025 424/776 |
| 2009/0012383 A1 | 5/2009 | Wiesmuller et al. | |
| 2009/0186134 A1 | 7/2009 | Wiesmuller et al. | |
| 2010/0089233 A1 | 4/2010 | Pirngruber et al. | |
| 2011/0168019 A1 | 7/2011 | Northrop et al. | |
| 2011/0217400 A1 | 9/2011 | Wenk et al. | |
| 2012/0209026 A1 | 8/2012 | Wiesmuller et al. | |
| 2013/0078356 A1 | 3/2013 | Mackereth et al. | |
| 2014/0018560 A1 | 1/2014 | Sandoz et al. | |
| 2016/0199774 A1 | 7/2016 | Grave et al. | |

FOREIGN PATENT DOCUMENTS

| | | |
|---|---|---|
| CA | 2 282 492 A1 | 9/1998 |
| CN | 102827128 A | 12/2012 |
| CN | 102827129 A | 12/2012 |
| CN | 103408524 A | 11/2013 |
| CN | 103450135 A | 12/2013 |
| CN | 103494848 A | 1/2014 |
| DE | 542 942 C | 1/1932 |
| DE | 35 42932 A1 | 6/1987 |
| DE | 102 00 226 A1 | 8/2003 |
| DE | 10 2007 037 067 A1 | 3/2008 |
| DE | 10 2014 110 190 A1 | 1/2016 |
| EP | 0 020 055 A1 | 12/1980 |
| EP | 0 041 723 A2 | 12/1981 |
| EP | 0 206 738 A2 | 12/1986 |
| EP | 0 154 258 B1 | 6/1989 |
| EP | 0 323 646 A2 | 7/1989 |
| EP | 0 323 699 A2 | 7/1989 |
| EP | 0 482 651 a1 | 4/1992 |
| EP | 0 531 104 A2 | 3/1993 |
| EP | 1 272 051 B1 | 7/2005 |
| EP | 2 072 102 A1 | 6/2009 |
| EP | 1 868 455 B1 | 4/2012 |
| EP | 3 120 712 A1 | 1/2017 |
| FR | 1.437.342 A | 4/1966 |
| JP | 4-281801 A | 10/1992 |
| KR | 10-2013-0090988 A | 8/2013 |
| PL | 189884 B1 | 10/2005 |
| WO | WO 91/04309 A1 | 4/1991 |
| WO | WO 91/14373 A1 | 10/1991 |
| WO | WO 92/08363 A1 | 5/1992 |
| WO | WO 96/11043 A1 | 4/1996 |
| WO | WO 98/08584 A1 | 3/1998 |
| WO | WO 98/28082 A1 | 7/1998 |
| WO | WO 01/37961 A2 | 5/2001 |
| WO | WO 01/65954 A1 | 9/2001 |
| WO | WO 01/78525 A1 | 10/2001 |
| WO | WO 02/089945 A2 | 11/2002 |
| WO | WO 2004/016277 A2 | 2/2004 |
| WO | WO 2004/026802 A1 | 4/2004 |
| WO | WO 2006/108650 A1 | 10/2006 |
| WO | WO 2008/002154 A2 | 1/2008 |
| WO | WO 2009/051606 A1 | 4/2009 |
| WO | WO 2009/125071 A2 | 10/2009 |
| WO | WO 2015/079262 A1 | 6/2015 |
| WO | WO 2015/121156 A1 | 8/2015 |
| WO | WO 2016/005769 A1 | 1/2016 |
| WO | WO 2016/166650 A1 | 10/2016 |
| WO | WO 2016/189114 A1 | 12/2016 |
| WO | WO 2016/189115 A1 | 12/2016 |
| WO | WO 2016/189328 A1 | 12/2016 |
| WO | WO 2016/189330 A1 | 12/2016 |
| WO | WO 2016/189332 A2 | 12/2016 |
| WO | WO 2016/189333 A1 | 12/2016 |
| WO | WO 2017/079766 A1 | 5/2017 |

OTHER PUBLICATIONS

U.S. Appl. No. 07/780,510, filed Oct. 22, 1991, Andrea Simon et al.

R. Eggers, et al., "Extraction Device for High Viscous Media in a High-Turbulent Two-Phase Flow with Supercritical $CO_2$," The Journal of Supercritical Fluids, vol. 6, No. 1, XP023999449, Mar. 1, 1993, pp. 31-37.

Biljana Damjanovic, et al., "Isolation of Essential Oil and Supercritical Carbon Dioxide Extract of *Juniperus communis* L. Fruits from Montenegro" Flavour and Fragrance Journal, vol. 21, XP055225805, 2006, pp. 875-880.

Joana Fonesca, et al., "An Apparatus for High-Pressure VLE Measurements Using a Static Mixer. Results for ($CO_2$ + Limonene + Citral) and ($CO_2$ + Limonene + Linalool)" Journal of Supercritical Fluids, vol. 25, XP4400234, 2003, pp. 7-17.

Tomás Horak, et al., "Supercritical Fluid Extraction in Analysis of PCBs and PAHs in Beer" Ecological Chemistry and Engineering, vol. 12, No. 7, 2005, pp. 703-708.

D. R. P. Jolly, "Wine Flavour Extraction with Liquid Carbon Dioxide" Process Biochemistry, 1981, pp. 36-40 and cover page.

Pavel Karásek, et al., "Partition Coefficients of Environmentally Important Phenols in a Supercritical Carbon Dioxide-Water System from Cocurrent Extraction without Analysis of the Compressible Phase" Analytical Chemistry, vol. 74, No. 16, Aug. 15, 2002, pp. 4294-4299.

Sang-Bin Lim, et al., "Continuous Cocurrent Extraction of Milk Fat by Supercritical Carbon Dioxide" J. Korean Soc. Food Nutr., vol. 23, 1994, pp. 459-465.

Siti Machmudah, et al., "Supercritical $CO_2$ Extraction of Rosehip Seed Oil: Fatty Acids Composition and Process Optimization" The Journal of Supercritical Fluids, vol. 41, XP22054911, 2007, pp. 421-428.

Siti Machmudah, et al., "Simultaneous Extraction and Separation Process for Coffee Beans with Supercritical $CO_2$ and Water" Industrial & Engineering Chemistry Research, 2011, pp. 2227-2235.

Seied Mandi Pourmortazavi, et al., "Supercritical Fluid Extraction in Plant Essential and Volatile Oil Analysis" Journal of Chromatography A, vol. 1163, 2007, pp. 2-24.

Egon Stahl, et al., "Deoiling of Crude Lecithin by High Pressure Jet Extraction with Carbon Dioxide" Fette—Seifen—Anstrichmittel, XP55272000, vol. 87, 1985, pp. 219-224 (with English translation).

E. Reverchon, et al., "Comparison of Processes for the Supercritical Carbon Dioxide Extraction of Oil from Soybean Seeds" JAOCS, vol. 71, No. 9, Sep. 1994, pp. 1007-1012.

(56) References Cited

OTHER PUBLICATIONS

Ernesto Reverchon, "Supercritical Fluid Extraction and Fractionation of Essential Oils and Related Products" Journal of Supercritical Fluids, vol. 10, XP4264796, 1997, pp. 1-37.
Christianne E. C. Rodrigues, et al., "Deacidification of Vegetable Oils by Solvent Extraction" Recent Patents on Engineering, vol. 1, No. 1, 2007, pp. 95-102.
Rui Ruivo, et al., "Process Integration of Supercritical Fluid Extraction and Membrane Separation to Recover "Vegetal" Squalene from Olive Oil Residues" Instituto de Tecnologia Química e Biológica, rui.ruivo@dq.fct.unl.pt, XP55155199, 2004, 6 Pages.
Rui Ruivo, et al., "Hydrodynamics and Mass Transfer of a Static Mixer at High Pressure Conditions" Chemical Engineering and Processing, vol. 45, XP24995290, 2006, pp. 224-231.
W. G. Schultz, et al., "Liquid Carbon Dioxide for Selective Aroma Extraction" Food Technology, vol. 24, Nov. 1970, pp. 94-98.
W. G. Schultz, et al., "Pilot-Plant Extraction with Liquid $CO_2$" Food Technology, Jun. 1974, pp. 32-34, 36 and 88.
H. Sovová, et al., "Rate of the Vegetable Oil Extraction with Supercritical $CO_2$-II. Extraction of Grape Oil" Chemical Engineering Science, vol. 49, No. 3, 1994, pp. 415-420.

Nikolas Wilkinson, et al., "Study of Process Variables in Supercritical Carbon Dioxide Extraction of Soybeans" Food Science and Technology International, XP55242510, 2012, pp. 63-70.
Eduard Alois Lack "Criteria for the Design of Plants for the High-Pressure Extraction of Natural Products" Institute for processing engineering of the Technical University of Graz, Jun. 1985, pp. 1-188 (with English translation).
Egon Stahl, et al., "Verdichtete Gase zur Extraktion und Raffination" Springer-Verlag Berlin, 1987, 14 Pages (with partial English translation).
Xiang Xu, et al., "Optimization of Supercritical Carbon Dioxide Extraction of Sea Buckthorn (*Hippophaë thamnoides* L.) Oil using Response Surface Methodology" LWT—Food Science and Technology., vol. 41, XP22650041, 2008, pp. 1223-1231.
Gregory R. Ziegler, et al., "Deodorization and Deacidification of Edible Oils with Dense Carbon Dioxide" JAOCS Journal of the American Oil Chemists Society, vol. 70, No. 10, XP000403775, Oct. 1993, pp. 947-953.
Extend European Search Report dated May 24, 2016 in Patent Application No. 15197955.6 (with English translation) with its English Translation.

* cited by examiner

PROCESS FOR EXTRACTION OF AROMA CHEMICALS FROM FAT-CONTAINING AND/OR AQUEOUS LIQUID PHASES

BACKGROUND OF THE INVENTION

Field of the Invention

The present invention relates to a process for continuous extraction of an aqueous and/or fat-containing liquid phase comprising aroma chemicals with a gas in the liquid or supercritical state.

Discussion of the Background

Aroma chemicals from various natural products are employed in various sectors such as foodstuffs and cosmetics but also pharmaceuticals. In the context of the present invention the term "aroma chemicals" is to be understood as meaning volatile compounds in foodstuffs which are perceived with the olfactory receptors either directly through the nose or via the pharynx during eating or drinking The literature describes in excess of 7000 relevant chemical compounds in this regard (RÖMPP Lexikon Lebensmittelchemie, ed. Gerhard Eisenbrand, Peter Schreier, 2nd edition, 2006, Georg-Thieme-Verlag, page 75).

Aroma chemicals from fruits for example are formed by from just a few dozen to several hundred chemical compounds depending on the plant species. These chemical compounds are in particular hydrocarbons (terpenes and sesquiterpenes) and oxygenated compounds (alcohols, aldehydes, ketones, acids, phenols, lactones, acetals, ethers and esters).

Aqueous solutions comprising fruit aromas are formed for example in the production of fruit juice concentrates: This involves concentration of fruit juices by evaporation. The fruit aromas present in the fruit vapours during the evaporation need to be added to the rediluted juice again before filling. However, the disadvantage of this aroma concentrate is its poor storage stability which is substantially attributable to the water content of the aroma extract. Processes to further concentrate the fruit aromas present in the fruit vapours have therefore been developed in the prior art, for example in EP 0 482 651 A1. These processes are based on using an extractant to extract the fruit aromas from the fruit vapours and thus further concentrate said aromas. It will be appreciated that there are also processes designed to remove undesired aroma chemicals from aqueous solutions. In this regard EP 0 041 723 A2 describes the extraction of aroma chemicals from brewer's yeast for example.

In addition to the extraction of aroma chemicals from aqueous solutions the extraction of aroma chemicals from more viscous media such as oils and fats is also of great economic interest and described in the prior art (WO 96/11043; R. Eggers & H. Wagner, J Supercrit Fluid 1993, 6, 31-37). As in the case of aqueous solutions in many cases it is the aroma chemicals in these oils and fats that are employed in cosmetics and/or foodstuffs.

This is the case especially for fats and oils of vegetable origin. For example, "Lexikon der pflanzlichen Fette and Öle", 2nd edition, Springer-Verlag Vienna 2013, pages 218, 219, 262 describes the chemical compounds responsible for the aroma spectrum of the peanut and the hazelnut. These fats and oils of vegetable origin may be derived from the respective plant material by various processes such as vapour distillation and extraction for example (summarized in S. M. Pourmortazavi & S. S. Hajimirsadeghi, J Chromatogr A 2007, 1163, 2-24 for example).

However, in many cases unpleasant-smelling aroma chemicals must additionally be removed from oils and fats. This is in particular often the case when the oils and fats are of animal origin. In these cases it is not the unpleasant-smelling aroma chemicals but rather the oils and fats freed from the aroma chemicals which are of economic interest and are therefore subjected to further processing. Animal oils and fats may for example be generated during slaughtering or during meat or fish processing.

The prior art extraction processes employ gases in the liquid or supercritical state. The gas is very often supercritical $CO_2$ which is employed under high pressure conditions (for example 264 bar, 50° C.). The extractant (supercritical $CO_2$) is mixed with the phase for extraction in a column in countercurrent or in cocurrent which causes the aroma chemicals to be transferred from the phase for extraction into the extractant. The isolated aroma chemicals may then be separated from the laden supercritical $CO_2$ in a further process step in which the latter is converted into the gaseous state by appropriate variation of the pressure and/or temperature and can therefore be removed easily. These processes are performed in continuous fashion.

SUMMARY OF THE INVENTION

While the prior art describes numerous processes for extraction of aroma chemicals from aqueous and/or fat-containing liquid phases there is still a need to further improve these described processes in terms of extraction efficiency. The problem addressed by the present invention is accordingly that of providing a process for extraction of an aqueous and/or fat-containing liquid phase which makes possible an extraction more efficient than the prior art processes.

A process which surprisingly solves the above-described problem has surprisingly now been found.

The invention accordingly provides a process for continuous extraction of an aqueous and/or fat-containing liquid phase $F_1$ comprising aroma chemicals with a gas $G_1$ in the liquid or supercritical state, wherein (a) a continuous stream $S_{F1}$ of $F_1$ is mixed with a continuous stream $S_{G1}$ of $G_1$ in cocurrent to obtain a continuous stream $S_1$ of a mixture of $S_{F1}$ and $S_{G1}$;

(b) the stream $S_1$ obtained in step (a) is continuously passed through a tube R having an internal surface $O_I$ and an external surface $O_A$, wherein $S_1$ contacts the internal surface $O_I$ of the tube R and whereby in $S_1$ during traversal of the tube R the aroma chemicals comprised by $S_{F1}$ are at least partly extracted into $S_{G1}$, whereby after traversal of the tube R a continuous stream $S_2$ of a mixture of a continuous stream $S_{F2}$ composed of liquid phase $F_2$ depleted in aroma chemicals compared to $S_{F1}$ and of a continuous stream $S_{G2}$ composed of liquid and/or supercritical gas $G_2$ enriched in aroma chemicals compared to $S_{G1}$ is obtained, characterized in that (c) at least a portion of the stream $S_2$ at least partly contacts the external surface $O_A$ of the tube R so that a heat exchange takes place between $S_2$ and $S_1$.

The process according to the invention features enhanced extraction efficiency compared to the prior art. This is evident from the improved extraction rates compared to the prior art that are obtained with the process according to the invention.

DETAILED DESCRIPTION OF THE INVENTION

Figure 1:
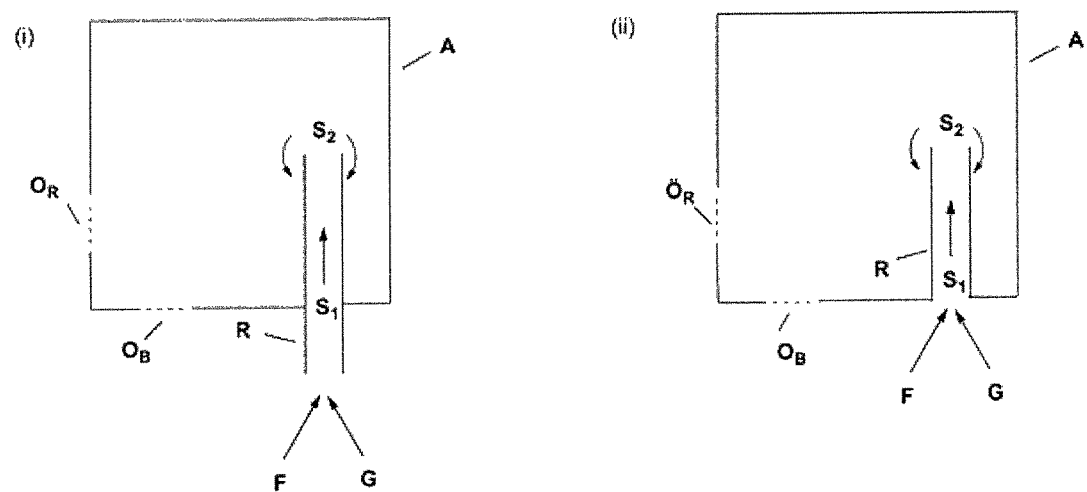
FIGS. 1 and 2 describe several preferred embodiments of the process according to the invention.

The process according to the invention employs an aqueous and/or fat-containing liquid phase $F_1$ comprising aroma chemicals and a gas $G_1$ in the liquid or supercritical state.

In step (a) of the process according to the invention a continuous stream $S_{F1}$ of $F_1$ is mixed with a continuous stream $S_{G1}$ of $G_1$ in cocurrent.

The term "liquid phase" implies that $F_1$ is employed in step (a) of the process according to the invention at a temperature $T_{F1}$ and a pressure $p_{F1}$ at which $F_1$ is in the liquid state of matter. The temperature necessary therefor $T_{F1}$ and the pressure necessary therefor $p_{F1}$ may be easily chosen by one skilled in the art on account of his knowhow. Employment in the liquid phase is necessary to ensure a sufficient flow rate of $F_1$.

"Aqueous and/or fat-containing liquid phase $F_1$" is to be understood as meaning that an aqueous liquid phase $F_1$ or a fat-containing liquid phase $F_1$ or a liquid phase $F_1$ that is both aqueous and fat-containing may be concerned.

An aqueous liquid phase $F_1$ is in particular an aqueous solution comprising aroma chemicals. Contemplated as the "aqueous solution comprising aroma chemicals" is in particular an aqueous solution comprising fruit aromas and preferably the vapour-water obtained during evaporation of fruit aromas. "Fruit aromas" are the fruit aromas characteristic for the respective fruits. "Vapour-water" refers to the vapour condensate from the evaporation of fruit juices. The fruit aromas may originate from any customary fruit variety. Contemplated here are in particular the following fruits: pineapples, apples, pears, dates, kumquats, kiwis, plums, cherries, apricots, oranges, limes, grapefruits, strawberries, raspberries, blackberries, blueberries, cranberries, rowanberries, serviceberries, checkerberries, redcurrants, blackcurrants, gooseberries. Apples are particularly preferred.

When $F_1$ is an aqueous liquid phase $T_{F1}$ is in particular in the range >0° C. and <100° C. $T_{F1}$ is preferably ≥15° C., more preferably ≥20° C., yet more preferably ≥25° C. $T_{F1}$ may then even be selected from the range 32° C. to 95° C., preferably 45° C. to 85° C., more preferably 50° C. to 75° C., yet more preferably 60° C. to 70° C. Simultaneously, when $F_1$ is an aqueous liquid phase the pressure $p_{F1}$ is in particular in the range 1 bar to 400 bar, preferably in the range from 74 bar to 350 bar, more preferably in the range from 100 bar to 300 bar, more preferably in the range from 100 bar to 260 bar.

A fat-containing liquid phase $F_1$ is in particular a fat or oil of vegetable or animal origin comprising aroma chemicals.

Contemplated as fats and oils of vegetable origin and comprising aroma chemicals are in particular (latin names which may be indicated in brackets refer to the plant species from which the relevant oil may be derived): Algae oil, apricot kernel oil (*Prunus armeniaca*), argan oil (*Argania spinosa*), avocado oil (*Persea americana*), babassu oil (*Attalea speciosa*), cottonseed oil (*Gossypium*), ben oil (*Moringa oleifera*), borage oil (*Borago officinalis*), nettle seed oil (*Urtica pilulifera* or *Urtica dioica*), cashew shell oil (*Anacardium occidentale*), cupuaçu butter (*Theobroma grandiflorum*), safflower oil (*Carthamus*), peanut oil (*Arachis hypogaea*), rosehip seed oil (*Rosa*), hemp oil (*Cannabis*), hazelnut oil (*Corylus avellana*), jatropha oil (*Jatropha curcas*), jojoba oil (*Simmondsia chinensis*), coffee bean oil (*Coffea*), cocoa butter (*Theobroma cacao*), tea seed oil (*Camellia*), acai palm (*Euterpe oleracea*), coconut oil (*Cocos nucifera*), pumpkin seed oil (*Cucurbita*), false flax oil (*Camelina sativa*), linseed oil (*Linum*), corn oil (*Zea mays*), macadamia oil (*Macadamia integrifolia, Macadamia tetraphylla*), almond oil (*Prunus dulcis*), mango butter (*Mangifera indica*), poppyseed oil (*Papaver*), evening primrose oil (*Oenothera biennis*), olive oil (*Olea europaea*), palm kernel oil (from kernels of *Elaeis guineensis*), palm oil (from flesh of *Elaeis guineensis*), papaya seed oil (*Carica papaya*), pecan nut oil (*Carya illinoinensis*), perilla oil (*Perilla frutescens*), pistachio oil (*Pistacia vera*), rapeseed oil (*Brassica napus*), rice bran oil (*Oryza sativa*), castor oil (*Ricinus communis*), sea buckthorn kernel oil (kernels of *Hippophae rhamnoides*), sea buckthorn oil (flesh of *Hippophae rhamnoides*), black caraway oil (*Nigella sativa*), mustard oil (*Brassica nigra*), sesame oil (*Sesamum indicum*), shea butter (*Vitellaria paradoxa*), soybean oil (*Glycine max*), sunflower oil (*Helianthus annuus*), grapeseed oil (*Vitis vinifera*), tung oil (*Vernicia, Aleurites*), walnut oil (*Juglans regia*), watermelon seed oil (*Citrullus lanatus*), wheat germ oil (*Triticum*). Coconut oil, hazelnut oil and peanut oil are preferred, hazelnut oil is particularly preferred.

Contemplated as fats and oils of animal origin and comprising aroma chemicals are in particular: marmot fat, butter fat, fish oil, cod liver oil, milk fat, pork lard, beef tallow, wool wax.

When $F_1$ is a fat-containing liquid phase $T_{F1}$ must be above the melting point of F. The melting point of a particular fat or oil is known to one skilled in the art and/or may be routinely determined by one skilled in the art. Typically, the oils are in the liquid state of matter at room temperature, the fats at ≥31° C. At a temperature $T_{F1}$ of $T_{F1}$≥31° C., in particular $T_{F1}$≥50° C., preferably $TF1$≥60° C., all fats and oils of vegetable and animal origin are in the liquid state of matter.

Thus when $F_1$ is a fat-containing liquid phase, $T_{F1}$ is in particular in the range >15° C. and <100° C. $T_{F1}$ is preferably ≥20° C., more preferably ≥25° C. $T_{F1}$ may then even be selected from the range 32° C. to 95° C., preferably 45° C. to 85° C., more preferably 50° C. to 75° C., yet more preferably 60° C. to 70° C. Simultaneously, when $F_1$ is a fat-containing liquid phase the pressure $p_{F1}$ is in particular in the range 1 bar to 400 bar, preferably in the range from 74 bar to 350 bar, more preferably in the range from 100 bar to 290 bar, more preferably in the range from 100 bar to 260 bar.

When $F_1$ is a liquid phase that is both aqueous and fat-containing, $T_{F1}$ and $p_{F1}$ preferably take the values reported for the case where $F_1$ is a fat-containing liquid phase.

To adjust the temperature $T_{F1}$ a heating means known to one skilled in the art may be employed.

The process according to the invention additionally employs a gas $G_1$ which is in the liquid or supercritical state. "Gas $G_1$" implies that the respective substance is in the gaseous state at standard temperature (25° C.) and standard pressure (1 bar). The gas G is employed at a temperature $T_{G1}$ and a pressure $p_{G1}$ at which it is in the liquid or supercritical state, preferably in the supercritical state. The establishment of such temperature and pressure conditions is known to one skilled in the art. To establish the supercritical state the respective substance is adjusted to a temperature $T_{G1}$ and a pressure $p_{G1}$ above the pressure and the temperature of the critical point of this substance.

The critical points of several gases $G_1$ are apparent from the following table:

| extractant | $P_{crit.}$ | $T_{crit.}$ |
|---|---|---|
| $CO_2$ | 72.9 bar | 31.0° C. |
| $N_2O$ | 71.4 bar | 36.5° C. |
| butane | 37.5 bar | 152.0° C. |
| propane | 42.0 bar | 96.8° C. |
| propene | 46.6 bar | 92.4° C. |
| ethane | 50.7 bar | 9.5° C. |

$G_1$ is in particular selected from carbon dioxide, ethane, propane, propene, butane, $N_2O$ and mixtures thereof $G_1$ is preferably selected from carbon dioxide, propane and mixtures thereof. $G_1$ is more preferably carbon dioxide, most preferably supercritical carbon dioxide. When the gas $G_1$ is $CO_2$ and this is to be employed in the supercritical state of matter then, in particular, a temperature above the critical temperature of $CO_2$ and below 100° C., in particular in the range from 32° C. to 95° C., preferably 45° C. to 85° C., more preferably 50° C. to 75° C., yet more preferably 60° C. to 70° C., is established in step a) of the process according to the invention. When the gas $G_1$ is $CO_2$ and this is to be employed in the supercritical state of matter then, in particular, a pressure above the critical pressure of $CO_2$ and below 400 bar, preferably in the range from 74 bar to 350 bar, more preferably in the range from 100 bar to 290 bar, yet more preferably in the range from 100 bar to 260 bar, is established in step a) of the process according to the invention.

Both streams $S_{G1}$ and $S_{F1}$ have a particular constant mass flow rate. In the case of $S_{G1}$ the mass flow rate is referred to as $Q_{G1}$. In the case of $S_{F1}$ the mass flow rate is referred to as $Q_{F1}$. The mass flow rate $Q_{G1}$ is to be understood as meaning in the case of $S_{G1}$ the mass of the supercritical or liquid gas $G_1$ passing a given cross section in the system in a particular time. In the case of $S_{F1}$ mass flow rate is to be understood as meaning $Q_{F1}$ the mass of $F_1$ passing a given cross section in the system in a particular time. The units of the mass flow rate are "kg s$^{-1}$". $Q_{G1}$ and $Q_{F1}$ may be determined by methods known to one skilled in the art, for example via a flowmeter, as described inter alia in DIN EN ISO 5167 1-4, by G. Strohrmann, Messtechnik im Chemiebetrieb, Munich 2004, Oldenbourg Industrieverlag or by O. Fiedler, Strömungs- and Durchflussmesstechnik, Munich 1992, Oldenbourg Industrieverlag.

$S_{G1}$ and $S_{F1}$ are then mixed in step (a) of the process according to the invention to obtain a continuous stream ($S_1$) of a mixture of $S_{F1}$ and $S_{G1}$.

Step (a) of the process according to the invention may be performed in any suitable system which permits mixing of the two streams $S_{F1}$ and $S_{G1}$. Typically, prior to being mixed the two streams $S_{F1}$ and $S_{G1}$ are run using a high-pressure pump through respective flow tubes at the end of which said streams collide and mix to afford stream $S_1$. $S_1$ is then run in step b) of the process according to the invention through a tube R as described hereinbelow.

It is essential to the process according to the invention that the mixing of the two streams $S_{F1}$ and $S_{G1}$ is effected in cocurrent. This feature "in cocurrent" is to be understood as meaning that the two vectors pointing in the flow directions of the respective streams form an angle α of ≤90° at the point at which the two streams $S_{F1}$ and $S_{G1}$ collide and mix. For example the stream $S_{G1}$ may be run in parallel separately from the stream $S_{F1}$ in two separate flow tubes which end at the same height at the point at which mixing is effected (then the above-described angle α=0°). The mixing is then effected in this third tube. It is likewise within the purview of the invention for one of the streams, for example $S_{F1}$, to be mixed with the other stream, for example $S_{G1}$, the two vectors pointing in the flow directions of the respective streams forming an acute angle or a right angle at the point at which the two streams $S_{F1}$ and $S_{K1}$ are mixed.

The mass ratio of $S_{F1}$:$S_{G1}$ in step b) of the process is in the range from 1:1 to 1:50, preferably 1:3 to 1:15. This is thus automatically the ratio of the mass of $F_1$ and the mass of liquid or supercritical gas $G_1$ in the resulting stream $S_1$. The stream $S_1$ is a heterogeneous mixture composed of aqueous and/or fat-containing liquid phase $F_1$ comprising aroma chemicals and the gas $G_1$ in the liquid or supercritical state. The resulting stream $S_1$ is thus biphasic and comprises $S_{F1}$ as one phase and $S_{G1}$ as the other phase.

The stream $S_1$ obtained in step (a) then is continuously passed through a tube R having an internal surface $O_I$ and an external surface $O_A$ in step b) of the process according to the invention. The tube R may have any conceivable geometry and may be a simple flow tube which is curved (e.g. helical) or uncurved and in cross section may have the geometry of a straight circular cylinder or else a triangle, quadrangle, pentagon or polygon. It is preferable when the tube R is a simple flow tube with a cross section having the geometry of a straight circular cylinder. The tube R may or may not comprise internals, but preferably does not comprise internals.

The material from which the tube is manufactured shall ensure good thermal conductivity. In particular the tube is at least partly composed of stainless steel.

It is essential to the invention that the stream $S_1$ obtained in step (a) traverses the tube R and the aroma substances comprised by $S_{F1}$ are thus at least partly extracted into $S_{G1}$. This occurs automatically during mixing of $S_{F1}$ and $S_{G1}$ in the stream $S_1$ during traversal of the tube on account of Nernst's distribution law.

The tube R has an internal surface $O_I$ and an external surface $O_A$. In accordance with the invention the term "internal surface $O_I$" is to be understood as meaning the part of the surface of the tube R which is contacted by the stream $S_1$ in step (b). In accordance with the invention the term "external surface $O_A$" is to be understood as meaning the part of the surface of the tube R which is not contacted by the stream $S_1$ in step (b).

In the stream $S_1$ the aroma chemicals are extracted from the aqueous and/or fat-containing liquid phase F1 into the liquid or supercritical gas phase $G_1$ due to the mere fact that the stream $S_1$, which of course comprises $S_{F1}$ and $S_{G1}$, traverses the tube R. This is already apparent from Nernst's distribution law. The extraction can be yet further improved when it is ensured that the stream $S_1$ traverses the tube R in a turbulent flow state. This ensures an even better mass transfer of the aroma chemicals from the aqueous and/or fat-containing liquid phase $F_1$ into the liquid or supercritical gas phase $G_1$. Since the stream $S_1$ in any case has a defined composition and accordingly its density and its dynamic viscosity are defined and since the tube R has a fixed geometry the Reynolds number Re of the stream $S_1$, and thus the flow state of the stream $S_1$, depends only on its flow velocity $v_1$ in accordance with the following equation <1>. When the Reynolds number of the stream $S_1$ exceeds a critical value $S_1$ changes over from the laminar to the turbulent flow state. The Reynolds number is calculated according to the following equation <1>:

$$Re = 2rv_1\rho/\eta. \qquad <1>$$

For a circular tube r is the radius thereof.

ρ is the density of the mixture of $F_1$ and liquid or supercritical $G_1$ comprised by the stream $S_1$.

η is the dynamic viscosity of the mixture of $F_1$ and liquid or supercritical $G_1$ comprised by the stream $S_1$.

Accordingly, one skilled in the art can calculate the flow velocity $v_1$ of the stream $S_1$ above which a turbulent flow is achieved on a case-by-case basis using equation <1>. Alternatively the changeover of the stream $S_1$ from the laminar to the turbulent flow state, i.e. the disappearance of the uninterrupted interface between $F_1$ and liquid or supercritical $G_1$ in the stream $S_1$, may also be ascertained visually and the flow velocity $v_1$ of the stream $S_1$ subjected to routine adjustment by one skilled in the art such that a turbulent flow is achieved. This is possible for example via a window present in the tube R and with the aid thereof one skilled in the art can easily observe the occurrence of a turbulent flow and thus set a velocity $v_1$ at which this turbulent flow occurs.

The fact that the flow velocity $v_1$ of $S_1$ in the tube R is selected such that $S_1$ traverses the tube R in the turbulent flow state ensures that in $S_1$ during traversal of the tube R the aroma chemicals present in $F_1$ are at least partly extracted into the liquid or supercritical gas $G_1$. The transfer of the aroma chemicals from $F_1$ to the liquid or supercritical gas $G_1$ is particularly readily ensured when $S_1$ traverses the tube R in the turbulent flow state.

In step b) of the process according to the invention the aqueous and/or fat-containing liquid phase $F_1$ in the stream $S_1$ is depleted of the aroma chemicals during traversal of the tube R and the gas $G_1$ in the liquid or supercritical state in the stream $S_1$ is enriched in aroma chemicals during traversal of the tube R. A continuous stream $S_2$ is thus obtained after traversal of the tube R. $S_2$ is the mixture of a continuous stream $S_{F2}$ of a liquid phase $F_2$ and a continuous stream $S_{G2}$ of liquid or supercritical gas $G_2$. $F_2$ is a liquid phase depleted in aroma chemicals compared to $F_1$. $G_2$ is liquid or supercritical gas enriched in aroma chemicals compared to $G_1$.

According to the invention $S_1$ refers to the stream from the moment when $S_{F1}$ and $S_{G1}$ are mixed to the moment when the stream $S_1$ exits the tube R. Once the stream $S_1$ has exited the tube R the stream is referred to as $S_2$ in accordance with the invention.

It is essential to the invention that after step (b) of the process according to the invention in a step (c) at least a portion of the stream $S_2$ at least partly contacts the external surface $O_A$ of the tube R so that a heat exchange takes place between $S_2$ and $S_1$. This can in particular be accomplished in simple fashion when the stream $S_2$ at least partly flows along the external surface $O_A$ of the tube R.

As a result the stream $S_1$ traversing the tube R is temperature-controlled by the stream $S_2$ exiting the end of the tube R. Since the stream $S_1$ necessarily varies in temperature during traversal of the tube R the temperature-dependent extraction of the aroma chemicals from $G_1$ into $F_1$ is subject to fluctuations so that the temperature of $S_1$ at the beginning of the tube R is distinct from said temperature at the end of the tube R. This problem becomes greater the longer the tube R and is thus exacerbated in precisely those cases in which a particularly efficient extraction is to be achieved by using a particularly long tube R. It has now been found that, surprisingly, the extraction efficiency can be markedly improved when the temperature of $S_1$ during traversal of the tube R is kept constant over the entire length thereof by utilizing the stream $S_2$ as heating medium for temperature-controlling the stream $S_1$ in the tube R. This has the advantage that no additional coolant or heatant need be employed since the stream $S_2$ itself functions as heating medium. In addition, no heating medium has a temperature as close to the temperature of $S_1$ than $S_2$. The further advantage of this procedure in step c) of the process according to the invention is therefore that no other heating medium can react to, and compensate for, the temperature fluctuations of the stream $S_1$ in the tube R as flexibly as $S_2$.

The at least partial contacting of the external surface $O_A$ of the tube R by at least a portion of the stream $S_2$ may be effected in any manner familiar to one skilled in the art. It need only be ensured that a heat exchange between the stream $S_2$ contacting the external surface $O_A$ of the tube R and the stream $S_1$ contacting the internal surface $O_I$ of the tube R takes place. In step (c) of the process according to the invention in particular at least 10%, preferably at least 20%, more preferably 30%, yet more preferably 40%, yet more preferably 50%, yet more preferably 60%, yet more preferably 70%, yet more preferably 80%, yet more preferably 90%, yet more preferably 95%, of the external surface $O_A$ of the tube R is contacted by the stream $S_2$ and advantageously not more than 95% of the external surface $O_A$ of the tube R is contacted by the stream $S_2$.

In a particular embodiment of the process according to the invention this is performed such that the flow direction of the stream $S_1$ on exiting the tube R is at least partly oriented against the gravitational force. The gravitational force thus acts on the stream $S_2$, the stream $S_2$ is thus deflected in the direction of the gravitational force and accordingly contacts the external surface $O_A$ of the tube R automatically.

In a further preferred embodiment the tube R leads into the interior of an autoclave A and the stream $S_1$ is passed through the tube R into the interior of the autoclave A in step (b). Autoclaves A are known to one skilled in the art. Using an autoclave A allows the temperature and pressure conditions to which $S_2$ is subjected to be better controlled. This also results in the additional advantage that in a yet more preferred embodiment the contacting of the external surface $O_A$ of the tube R with at least a portion of the stream $S_2$ can be further improved when the stream $S_2$ is backed up in the autoclave A and the backed-up stream $S_2$ at least partially covers the external surface $O_A$ of the tube R located in the interior of the autoclave. This further improves the heat exchange between $S_2$ and $S_1$.

The backing-up of the stream $S_2$ in the autoclave may be effected in several ways conceivable to one skilled in the art. Thus the stream $S_2$ may be backed-up in the autoclave A by simply letting $S_2$ run into the autoclave interior so that the level of $S_2$ in the autoclave interior keeps increasing. There may alternatively also be an opening in the floor of the autoclave A or a side wall of the autoclave A through which $S_2$ can partly but not completely drain so that $S_2$ backs up in the autoclave A more slowly.

It is advantageous when a further step (d) is performed in the process according to the invention. In this step (d) of the process according to the invention the $S_{G2}$ present in $S_2$ is then continuously separated from the $S_{F2}$ present in $S_2$.

This preferred step (d) may be performed simultaneously with step (c). In such an embodiment of the process according to the invention, which is yet more preferably performed inside an autoclave A, shortly after the stream $S_1$ exits the tube R the stream $S_2$ splits in such a way that the $S_{G2}$ captured by $S_2$ at least partly flows off upwards and the $S_{F2}$ captured by $S_2$ at least partly flows off downwards and it is then only this portion of $S_2$ that flows off downwards which touches the external surface OA of the tube R. In this embodiment step (d) of the process according to the invention thus proceeds without any requirement for further separation steps.

Alternatively or in addition to further improve the continuous separation of the $S_{G2}$ present in $S_2$ from the $S_{F2}$ present in $S_2$ such a separation may be achieved by initially passing the stream $S_2$ into a phase separator and separating the phase $S_{F2}$ depleted in aroma chemicals from the liquid or supercritical gas phase $S_{G2}$ enriched in aroma chemicals. The separation is preferably achieved by reducing the flow rate of the stream $S_2$ in the phase separator as a result of which an uninterrupted interface is formed between $S_{G2}$ and $S_{F2}$ and the two streams are easily separated from one another in continuous fashion. The enriched liquid or supercritical gas phase $S_{G2}$ enriched in aroma chemicals is then passed into an extract separator where by pressure reduction and evaporation of the gas $G_2$ the aroma-containing extract is derived (also described in EP 0 159 021 A2 for example).

Figure 2:
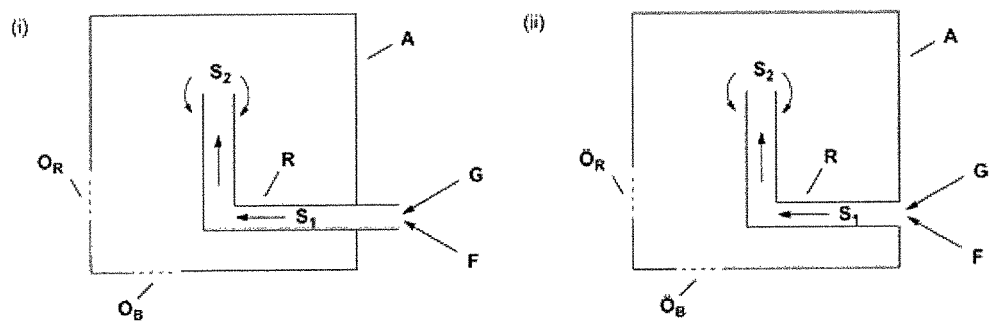

FIGS. 1 and 2 describe several preferred embodiments of the process according to the invention.

In the preferred embodiment of the process according to the invention depicted in FIG. 1 a tube R with or without internals, but preferably without internals, projects into the interior of an autoclave A. The tube R is perpendicular to the floor of the autoclave A and protrudes from the floor of the autoclave A [FIG. 1, (i)] or terminates flush with the floor of the autoclave A [FIG. 1, (ii)]. The tube may form a right angle (90°) or acute angle (e.g. 60° or 45° or 30°) with the floor of the autoclave A—FIG. 1 shows a right angle. The two streams $S_{F1}$ and $S_{G1}$ are mixed in cocurrent outside the autoclave A so that a stream $S_1$ is obtained which (precisely because the tube R forms a right angle or acute angle with the floor of the autoclave A) flows through the tube R against the gravitational force and thus contacts the internal surface $O_I$ of the tube R. Once $S_1$ has exited the tube R the stream $S_2$ is obtained. Immediately after the stream $S_1$ has exited the tube R the flow direction of the stream $S_2$ is initially oriented against the gravitational force but is then deflected by the gravitational force acting on the stream $S_2$. $S_2$ thus at least partly flows down along the outside of tube R and thus at least partly contacts the external surface $O_A$ of the tube R. A heat exchange between $S_1$ and $S_2$ accordingly takes place.

In this case "against the gravitational force" is to be understood as meaning that at least a portion of the movement vector of the flow direction of the particular stream is oriented against the gravitational force. This can be ensured by running the tube R through the floor of an autoclave A as shown in FIG. 1, wherein one end of the tube R is outside the autoclave or begins immediately at the autoclave floor and the other end of the tube R ends in the interior of the autoclave A. In step b) of the process according to the invention the stream $S_1$ is passed through the tube R into the interior of the autoclave A. In the autoclave A the stream $S_1$ exits at the end of the tube R located in the autoclave and at least partly flows down along the outside of the tube R as stream $S_2$ so that a heat exchange between $S_1$ and $S_2$ takes place.

In an alternative embodiment of the present invention shown in FIG. 2 the tube R may also lead into the autoclave A from a side wall thereof. The tube R is perpendicular to the side wall of the autoclave A and protrudes from the side wall of the autoclave A on the outside of the autoclave [FIG. 2, (i)] or terminates flush with the side wall of the autoclave A [FIG. 2, (ii)]. The tube may form a right angle (90°) or acute angle (e.g. 60° or 45° or 30°) with the side wall of the autoclave A as long as it is ensured that the flow direction of the stream $S_1$ on exiting the tube R is at least partly oriented against the gravitational force. Accordingly, when the tube R forms an acute angle (e.g. 60° or 45° or 30°) with the side wall of the autoclave A the end of the tube R located in the interior of the autoclave A must be at a position higher (meaning further from the autoclave floor) than the point at which the tube R passes through the side wall of the autoclave A. When the tube R forms a right angle with the side wall of the autoclave A the tube R must therefore have a bend which ensures that the end of the tube R located in the interior of the autoclave A must be at a position higher (meaning further from the autoclave floor) than the point at which the tube R passes through the side wall of the autoclave A. FIG. 2 shows the case in which the tube R forms a right angle with the side wall of the autoclave A and therefore exhibits a bend inside the autoclave. This ensures that the stream $S_1$ on exiting the tube R is at least partly oriented against the gravitational force.

The autoclave A need not comprise any further openings and the stream $S_2$ can therefore back up in the autoclave interior after contacting the external surface $O_A$ of the tube R. In this preferred embodiment the heat exchange between $S_1$ and $S_2$ can yet more preferably be further improved when in addition the stream $S_2$ also backs up in the autoclave interior and the tube R is thus immersed in the backed-up stream $S_2$. The rise in the phase $S_2$ in the autoclave interior immerses the tube R in said phase to an ever greater extent and the heat exchange between $S_1$ in the tube R and $S_2$ outside said tube becomes ever more uniform as a result. It will be appreciated that this can only be continued until the end of the tube from which $S_2$ exits is not itself immersed therein.

However, the autoclave A can advantageously comprise at least one opening through which the stream $S_2$ can be at least partly discharged from the autoclave. This can be achieved through an opening $Ö_B$ in the floor of the autoclave and/or an opening $Ö_R$ in the autoclave side wall. Such openings allow the level of $S_2$ in the autoclave A to be better controlled.

The examples which follow are intended to elucidate the present invention without limiting said invention thereto.

Having generally described this invention, a further understanding can be obtained by reference to certain specific examples which are provided herein for purposes of illustration only, and are not intended to be limiting unless otherwise specified.

EXAMPLES

Examples E1 and V1

Extraction of Hazelnut Oil

Starting material: oil from roasted hazelnuts
Aim: Enrichment of the aroma fraction by CO2 high-pressure extraction Example V1

Cocurrent Extraction with Supercritical $CO_2$ without Heat Exchange between $S_1$ and $S_2$ and with Product Autoclave Entry at Top Hazelnut oil is heated to 45° C. via a heat exchanger with a pump conveying 180 kg/h. The hazelnut oil is mixed with a stream of $CO_2$ in the supercritical state (pressure 290 bar, temperature 50° C.; throughput 2700 kg/h) outside the autoclave. The stream of oil and $CO_2$ is subsequently pumped into the autoclave interior from above via a tube protruding vertically from the autoclave ceiling. For a diameter of 41 cm and a height of 151 cm the autoclave has a volume of 200 l. After exiting the tube in the autoclave the dearomatized oil collects at the floor of the autoclave and is continuously discharged from the autoclave interior via an intermediate separator and then decompressed to atmospheric pressure. The $CO_2$ (laden with aroma and small amounts of oil) continuously flowing off upwards on exiting the tube in the interior of the autoclave is discharged from the interior of the autoclave via an extraction valve and decompressed to 45 bar in an extract separator. At precisely defined time intervals the drawn-off amount of extract is related to the amount of $CO_2$ that has flowed through the autoclave to determine the loading.

The average loading with peanut oil per kg of $CO_2$ is 2.62 g with a deviation of +/−12%.

In the extractant separator the $CO_2$ is evaporated and the extract is precipitated out. The gaseous $CO_2$ is returned to the extraction circuit.

The extract enriched in hazelnut aroma is continuously decompressed to atmospheric pressure.

Example E1

Cocurrent Extraction with Supercritical $Co_2$ with Heat Exchange between $S_1$ and $S_2$ and with Product Autoclave Entry at Bottom Hazelnut oil is heated to 45° C. via a heat exchanger with a pump conveying 180 kg/h. The hazelnut oil is mixed with a stream of CO2 in the supercritical state (pressure 290 bar, temperature 50° C.; throughput 2700 kg/h) outside the autoclave. The autoclave has a diameter of 41 cm, a height of 151 cm and a volume of 200 l and contains no packings. The stream of oil and $CO_2$ is subsequently pumped into the autoclave interior from below via a tubular coil (5.50 m) extending vertically upward from the autoclave floor. The continuous temperature adaption and the resulting mass transfer is effected in the tubular coil affixed to the container floor/interior. At the end of the tubular coil the phase exiting there flows tangentially against the container wall and the phase exiting there also flows down over the tubular coil onto the autoclave floor. The flow rate is thus severely reduced and the phase separation takes place—$CO_2$ laden with aroma flows upwards and dearomatized oil settles downwards on account of the density difference. The oil is then continuously decompressed against atmospheric pressure via an intermediate separator. The $CO_2$ continuously flowing off upwards (laden with aroma and oil) is decompressed to 45 bar into the extract separator via an extraction valve. The $CO_2$ is evaporated and the extract precipitated out. At precisely defined time intervals the drawn-off amount of extract is related to the amount of $CO_2$ that has flowed through the autoclave to determine the loading.

The average loading with hazelnut oil per kg of $CO_2$ is 3.41 g with a deviation of +/−2.5%.

The gaseous $CO_2$ is returned to the extraction circuit. The extract enriched in hazelnut aroma is continuously decompressed to atmospheric pressure.

The obtained aroma quality is substantially more intense/selective and uniform than for the cocurrent extraction/$CO_2$ with product autoclave entry at top Determining extraction efficiency by tasting:

To determine the efficiency of the extraction the respective extracts obtained in comparative example V1 and inventive example E1 were stirred into cow's milk so that said milk had a concentration of the respective extract of 50 ppm, 100 ppm, 200 ppm (process as per G. Eisenbrand, P. Schreier, A. H. Meyer, RÖMPP Lexikon Lebensmittelchemie, 2nd edition, 2006, Georg-Thieme Verlag Stuttgart, New York, pages 434-435). The thus obtained mixture was then tasted to ascertain the dilution up to which a specific hazelnut aroma remained discernible. The results are shown in the table which follows:

| dilution of respective extract in cow's milk [in ppm] | hazelnut aroma threshold determination | |
|---|---|---|
| | extract from cocurrent/top (comparative example) | extract from cocurrent/bottom (inventive example) |
| 50 | no | yes |
| 100 | to limited extent | yes |
| 200 | yes | yes |

While for the extract obtained by cocurrent extraction/bottom the specific hazelnut aroma could still be clearly perceived at a dilution of 50 ppm this was no longer possible for the extract obtained by cocurrent extraction/top. The hazelnut aroma is only perceivable to a limited extent even when diluted to 100 ppm.

The following surprising advantages thus arise from the above examples:

1) The loading of the $CO_2$ is subjected to much smaller fluctuations in the cocurrent extraction (+/−2.5% for E1 compared to +/−12% for V1).
2) The quality of the aroma in the extract obtained by means of inventive example E1 is substantially more intensive/selective and uniform than for the extract obtained by means of comparative example V1.

The relevant results can also be achieved using other oils, for example peanut oil or coconut oil.

Such results can also be achieved with aqueous solutions comprising fruit water as is apparent from the examples which follow.

Example E2

Extraction of Apple Fruit Water

An aqueous solution having an apple aroma content of 1000 ppm and an ethanol content of 3.0 wt % is injected in flow direction into the $CO_2$ conduit immediately before entry into an autoclave (50° C., 260 bar, 18 kg $CO_2$/h) using a pump at 6 kg/h and at room temperature. The continuous temperature adaption and the resulting mass transfer is effected in the tubular coil affixed to the container floor. At the end of the tubular coil the phase exiting there flows tangentially against the container wall and the phase exiting there also flows down over the tubular coil onto the autoclave floor. The two phases thus separate—$CO_2$ laden with aroma flows upwards and dearomatized water settles downwards on account of the density difference. The water is then continuously decompressed against atmospheric pressure via an intermediate separator. The $CO_2$ laden with aroma is reduced to 45 bar in the extract separator. The $CO_2$ is thus evaporated and the aroma extract is precipitated out.

European patent application EP15197955 filed Dec. 4, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for continuous extraction of an aroma chemical, comprising:

(a) mixing a continuous stream $S_{F1}$ of an aqueous and/or fat-containing liquid phase $F_1$ with a continuous stream $S_{G1}$ of a gas $G_1$ in cocurrent to obtain a continuous stream $S_1$ of a mixture of the streams $S_{F1}$ and $S_{G1}$, wherein the liquid phase $F_1$ comprises an aroma chemical and the gas $G_1$ is in a liquid or supercritical state;

(b) continuously passing the stream $S_1$ through a tube R having an internal surface $O_I$ and an external surface $O_A$, such that the stream $S_1$ contacts the internal surface $O_I$ and that the aroma chemical in the stream $S_{F1}$ is at least partly extracted into the stream $S_{G1}$ while passing through the tube R, thereby obtaining a continuous stream $S_2$ exited the tube R, wherein the stream $S_2$ is a mixture of a continuous stream $S_{F2}$ comprising a liquid phase $F_2$ containing a smaller amount of the aroma chemical compared to the stream $S_{F1}$ and a continuous stream $S_{G2}$ comprising liquid and/or supercritical gas $G_2$ enriched in the aroma chemical compared to the stream $S_{G1}$; and (c) at least partly contacting at least a portion of the stream $S_2$ with the external surface $O_A$ of the tube R such that a heat exchange takes place between the streams $S_2$ and $S_1$, wherein the stream $S_1$ when exiting the tube R is at least partly oriented against the gravitational force.

2. The process of claim 1, further comprising:

(d) continuously separating the stream $S_{G2}$ from the stream $S_{F2}$.

3. The process of claim 2, wherein the separating in (d) is performed such that the stream $S_{G2}$ is directed upwards and that the stream $S_{F2}$ is directed downwards due to the gravitational force.

4. The process of claim 1, wherein the liquid phase $F_1$ is a fat or oil of vegetable or animal origin comprising the aroma chemical.

5. The process of claim 4, wherein the liquid phase $F_1$ comprises at least one selected from the group consisting of peanut oil, hazelnut oil, and coconut oil.

6. The process of claim 1, wherein the liquid phase $F_1$ is an aqueous solution having a fruit aroma.

7. The process of claim 6, wherein the fruit aroma is apple aroma.

8. The process of claim 1, wherein the gas $G_1$ is selected from the group consisting of carbon dioxide, ethane, propane, propene, butane, $N_2O$ and mixtures thereof.

9. The process of claim 8, wherein the gas $G_1$ is supercritical carbon dioxide.

10. The process of claim 1, wherein a part of the stream $S_1$ exiting the tube R is first oriented against the gravitational force and then flows following the gravitational force.

11. The process of claim 1, wherein the tube R leads into the interior of an autoclave A, and, in (b), the stream $S_1$ is passed through the tube R into the interior of the autoclave A.

12. The process of claim 11, wherein the stream $S_2$ is backed up in the autoclave A such that the backed-up stream $S_2$ at least partially covers the external surface $O_A$ of the tube R located interior of the autoclave A.

13. The process of claim 1, wherein the liquid phase $F_1$ is a fat or oil of vegetable origin comprising the aroma chemical.

14. The process of claim 1, wherein, in (b), the stream $S_1$ is oriented against the gravitational force.

15. The process of claim 1, wherein, in (b), a mass ratio of the stream $S_{F1}$ to the stream $S_{G1}$ is from 1:1 to 1:50.

16. The process of claim 1, wherein the tube R is at least partly composed of stainless steel.

17. The process of claim 1, wherein, in (c), the portion of the stream $S_2$ contacted with the external surface $O_A$ of the tube R flows along the external surface $O_A$.

* * * * *